United States Patent
Klymenko et al.

(10) Patent No.: US 9,855,857 B2
(45) Date of Patent: Jan. 2, 2018

(54) ACTIVE DAMPING CONTROL FOR AN ELECTRIC VEHICLE OR HYBRID VEHICLE

(75) Inventors: Mykhaylo Klymenko, Gerlingen (DE); Michael Mecks, Vaihingen (DE); Markus Kretschmer, Pleidelsheim (DE); Gunther Goetting, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 14/351,233

(22) PCT Filed: Sep. 4, 2012

(86) PCT No.: PCT/EP2012/067195
§ 371 (c)(1),
(2), (4) Date: Apr. 11, 2014

(87) PCT Pub. No.: WO2013/053547
PCT Pub. Date: Apr. 18, 2013

(65) Prior Publication Data
US 2014/0257617 A1    Sep. 11, 2014

(30) Foreign Application Priority Data
Oct. 14, 2011    (DE) .................. 10 2011 084 548

(51) Int. Cl.
*B60L 15/20*    (2006.01)
*B60W 30/20*    (2006.01)
*B60W 50/00*    (2006.01)

(52) U.S. Cl.
CPC .............. *B60L 15/20* (2013.01); *B60W 30/20* (2013.01); *B60L 2240/12* (2013.01);
(Continued)

(58) Field of Classification Search
CPC ........... B60W 30/20; B60W 2710/083; B60W 2710/0666; B60W 2050/0041;
(Continued)

(56) References Cited

U.S. PATENT DOCUMENTS 6,441,506 B2    8/2002   Nakashima
6,806,667 B1   10/2004   Sasaki et al.
(Continued)

FOREIGN PATENT DOCUMENTS

CN    1521045    8/2004
CN    1682042   10/2005
(Continued)

OTHER PUBLICATIONS

International Search Report for Application No. PCT/EP2012/067195 dated Nov. 27, 2012 (English Translation, 2 pages).

*Primary Examiner* — Nga X Nguyen
(74) *Attorney, Agent, or Firm* — Michael Best & Friedrich LLP

(57) ABSTRACT

The invention relates to a method (30) for the active damping control for an electric vehicle or hybrid vehicle having an electric motor drive element (4), comprising the steps of receiving a current target torque value ($tq_{ElmDes}$) of the electric motor drive element (4), determining a current rotational angle value ($\varphi_{ElmAct}$) of the electric motor drive element (4), and determining a current damping torque value ($tq_{Dmp}$), characterized in that the current damping torque value ($tq_{Dmp}$) is determined using a reduced drive train model (rTSM).

11 Claims, 3 Drawing Sheets

(52) U.S. Cl.
CPC ... *B60L 2240/421* (2013.01); *B60L 2240/423* (2013.01); *B60L 2240/461* (2013.01); *B60L 2270/145* (2013.01); *B60W 2050/0041* (2013.01); *B60W 2540/10* (2013.01); *B60W 2710/083* (2013.01); *Y02T 10/645* (2013.01); *Y02T 10/7275* (2013.01)

(58) Field of Classification Search
CPC ............... B60W 2540/10; B60L 15/20; B60L 2240/423; B60L 2240/12; B60L 2240/421; B60L 2240/461; B60L 2270/145; F16H 61/32; Y10T 74/19251; Y10T 74/20018; Y10T 74/2003; Y10T 74/20104; Y02T 10/7275; Y02T 10/645

USPC .......................................................... 701/22
See application file for complete search history.

(56) References Cited

U.S. PATENT DOCUMENTS

| | | | |
|---|---|---|---|
| 7,495,403 | B2 | 2/2009 | Soudier et al. |
| 8,219,304 | B2 * | 7/2012 | Soma .............................. 701/111 |
| 2006/0030979 | A1 * | 2/2006 | Kuang et al. ................... 701/22 |
| 2010/0282532 | A1 | 11/2010 | Falkenstein |
| 2012/0059544 | A1 * | 3/2012 | Kinoshita .......... B60G 17/0164 701/22 |
| 2013/0184918 | A1 * | 7/2013 | Motosugi et al. .............. 701/22 |

FOREIGN PATENT DOCUMENTS

| | | |
|---|---|---|
| CN | 1976835 | 6/2007 |
| DE | 4308879 | 9/1993 |
| DE | 102007043736 | 3/2009 |
| DE | 102008000870 | 10/2009 |
| JP | 2000217209 | 8/2000 |
| WO | WO 2008111595 A1 * | 9/2008 |
| WO | WO 2012011521 A1 * | 1/2012 |

* cited by examiner

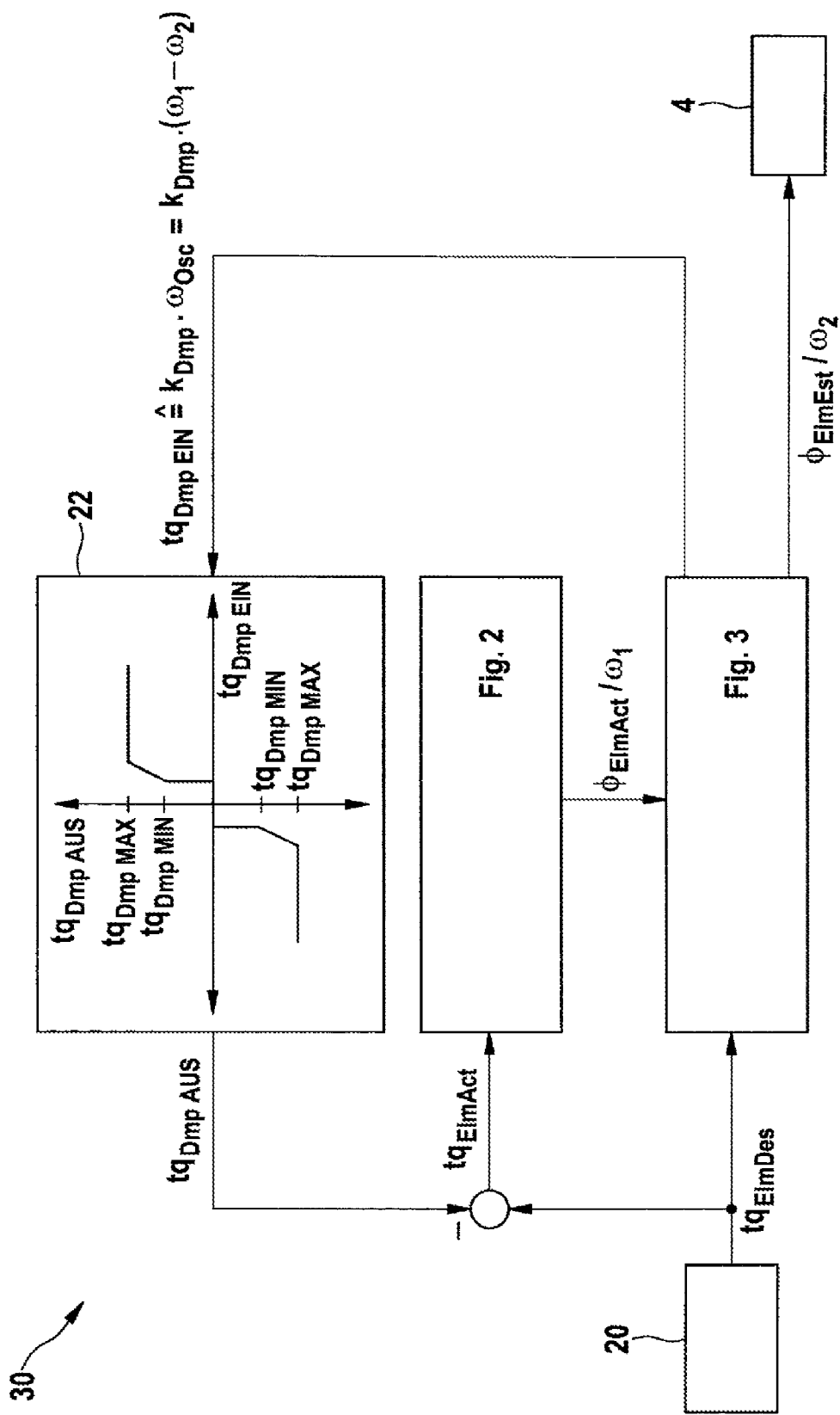

ACTIVE DAMPING CONTROL FOR AN ELECTRIC VEHICLE OR HYBRID VEHICLE

BACKGROUND OF THE INVENTION

The present invention relates to drive technology in vehicles. In particular, the present invention relates to the damping of a vibration behavior of an electric motor drive element. The present invention also especially relates to a method for active damping control for an electric vehicle or hybrid vehicle having an electric motor drive element and a controller and a vehicle.

Electric motors are being ever more often used as at least one drive component in motor vehicles. However, one property of a vehicle drive train having an electric motor as the drive motor is its ability to vibrate. It can therefore be possible that the revolution rate of an electric motor can oscillate significantly, especially during dynamic load changes, despite an essentially smooth profile of a propulsive torque of the electric motor.

The illustrations of FIGS. 1a, b show the torque $tq_{Elm}$ at the point in time t=1 s as an essentially step increase from 0 Nm to e.g. 50 Nm, whereas, however, the revolution rate of the electric motor $n_{Elm}$ in revolutions/minute has a known oscillation characteristic in the range of times between t=1 s and t=1.5 s up to t=2 s. From t=2 s the applied torque $tq_{Elm}$ gives an essentially linear rise of the revolution rate $n_{Elm}$.

In this connection, such behavior occurs regularly independently of a special implementation of a drive train, whereby it can be shown as irrelevant whether the drive train is a so-called electric axle, a combination of an electric motor with a differential transmission, a conventional drive train or a wheel hub drive.

Such occurring oscillations also mean, besides a loss of comfort, a significantly increased mechanical load on the drive train.

SUMMARY OF THE INVENTION

One aspect of the present invention can thus be seen in the preferred damping of the oscillation behavior of an electric motor of a vehicle. Accordingly, a method for active damping control for an electric vehicle or hybrid vehicle with an electric motor drive element, a controller for a vehicle arranged to perform the method according to the invention and a vehicle comprising a controller according to the invention are shown.

The oscillation characteristic or the tendency to oscillate can be reduced or completely prevented by the use of a so-called observer element, which estimates the oscillation characteristic of a downstream vehicle drive train from a calculated or specified torque and a measured revolution rate of an electric motor element and superimposes an oscillation compensation torque on the specified target torque.

Furthermore, the method according to the invention is described with reference to a so-called reduced drive train model (rDTM), essentially a two-mass oscillator, which simulates the dynamics of the drive train with adequate accuracy.

It is significant here that the electric motor drive element has a first angular speed or revolution rate $\omega_1$ of its rotor and the vehicle or its mass has a second angular speed/revolution rate $\omega_2$. The second revolution rate can be represented e.g. by the slip-free rotation of the drive wheels, but where the mass of the drive wheels has been compensated such that it essentially relates to an equivalent vehicle mass, thus representing as it were the entire vehicle mass combined or located in the drive wheels.

In cases where $\omega_1$ equals $\omega_2$ this means that, at least currently, there is no oscillation behavior in the reduced drive train model. An oscillation behavior $\omega_{Osc}$ of the vehicle drive train is represented as follows:

$$\omega_{Osc} = \omega_1 - \omega_2$$

In cases where $\omega_{Osc}$ is not equal to 0, the reduced drive train model exhibits an oscillation behavior. A compensation torque or damping torque $tq_{Dmp}$ can subsequently be determined from the oscillation characteristic $\omega_{Osc}$ in a further step.

The damping torque value $tq_{Dmp}$ can initially be determined from the oscillation characteristic $\omega_{Osc}$ according to $tq_{Dmp} = k_{Dmp} * \omega_{Osc}$ using a constant factor or multiplier $k_{Dmp}$.

For a calculation of the damping torque value $tq_{Dmp}$, referred to below as the compensation torque or compensation moment, that is as ideal as possible this must be adapted under the influence of the usual constant factor $k_{Dmp}$ for effective use in hybrid vehicles and/or electric vehicles. Because of the oscillation behavior of a drive train being dependent on different factors, a non-constant form of the factor $k_{Dmp}$ is to be preferred to achieve preferred damping of a drive train.

For example, the natural damping of a drive train can vary depending on the speed of the vehicle, e.g. the natural damping of the drive train can increase with increasing speed of the vehicle, while on the other hand the dynamics of the torque regulation of an electric machine can decrease. A preferred reduction of oscillation behavior can thus be achieved by designing the scaling factor $k_{Dmp}$ to be dependent on the speed of the vehicle, the wheel revolution rate or the revolution rate of the rotor of the electric motor drive element or the estimated revolution rate $\omega_2$.

In addition, the compensation torque $tq_{Dmp}$ cannot be implemented in its maximum possible bandwidth. The magnitude of the compensation torque $tq_{Dmp}$ can be limited to a value $tq_{Dmpmax}$ here, because on the one hand it is not necessary to compensate a tendency to oscillate of a drive train with a maximum possible torque of an electric motor drive element and on the other hand an unnecessarily high torque can load mechanical components such as e.g. axle shafts or transmission elements to an unnecessary extent.

Furthermore, in certain driving situations erroneous or corrupted sensor information can result in stimulation of oscillation of the vehicle drive train. In other words, e.g. inaccurate or incorrectly determined sensor information can lead to an effective worsening of the situation. Such erroneous drive train stimulation through inaccurate or erroneous sensor information, especially in a very low speed range of the vehicle, can be avoided by means of an activation threshold. In other words a compensation torque is only effectively applied to the drive train if the compensation torque $tq_{Dmp}$ has exceeded a known activation threshold $tq_{Dmpmin}$. Below said activation threshold a compensation torque $tq_{Dmp} = 0$ is achieved.

A compensation torque $tq_{Dmp}$ is thus only applied on exceeding an activation point $tq_{Dmpmin}$ and is further limited to a maximum value $tq_{Dmpmax}$. The compensation torque $tq_{Dmp}$ can also be adapted to the speed of the vehicle by representing the scaling factor $k_{Dmp}$ as a function of the speed of the vehicle ($k_{Dmp} = f(v)$), a function of the wheel revolution rate ($k_{Dmp} = f(n_{Rad})$) or rotor revolution rate ($k_{Dmp} = f(\omega_1)$) of the electric machine or the estimated revolution rate ($k_{Dmp} = f(\omega_2)$) of the equivalent vehicle mass.

If in the context of the present description a reduced drive train model (rDTM) is mentioned, then in the following this especially means the reduced drive train model according to FIG. 3.

BRIEF DESCRIPTION OF THE DRAWINGS

Embodiments of the invention are illustrated in the figures and explained in detail in the following description.

In the figures

FIG. 4 shows an exemplary process diagram of the method for active damping control according to the present invention

DETAILED DESCRIPTION

Figure 1A:
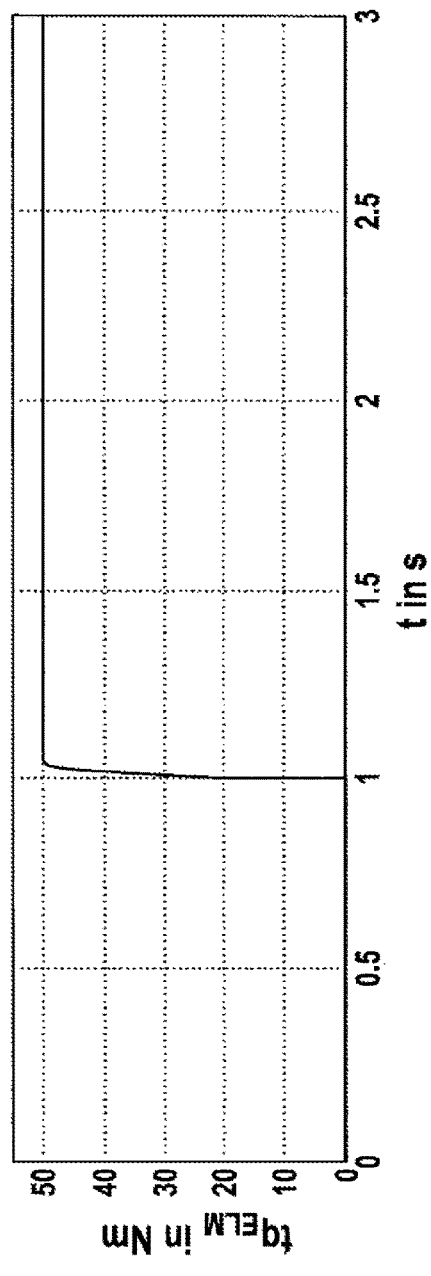
FIGS. 1a, b show an exemplary oscillation characteristic of a drive train.
Figure 1B:
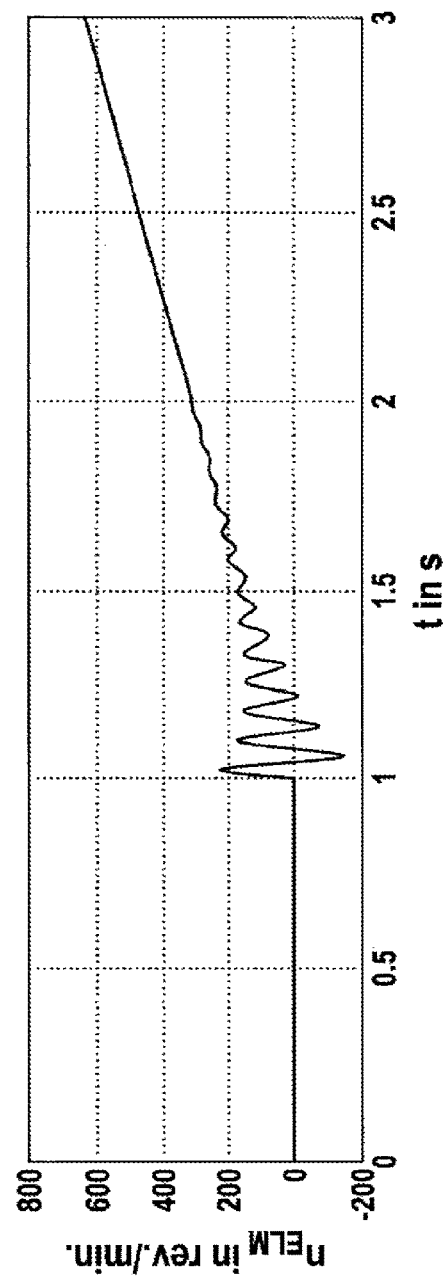
Figure 2:
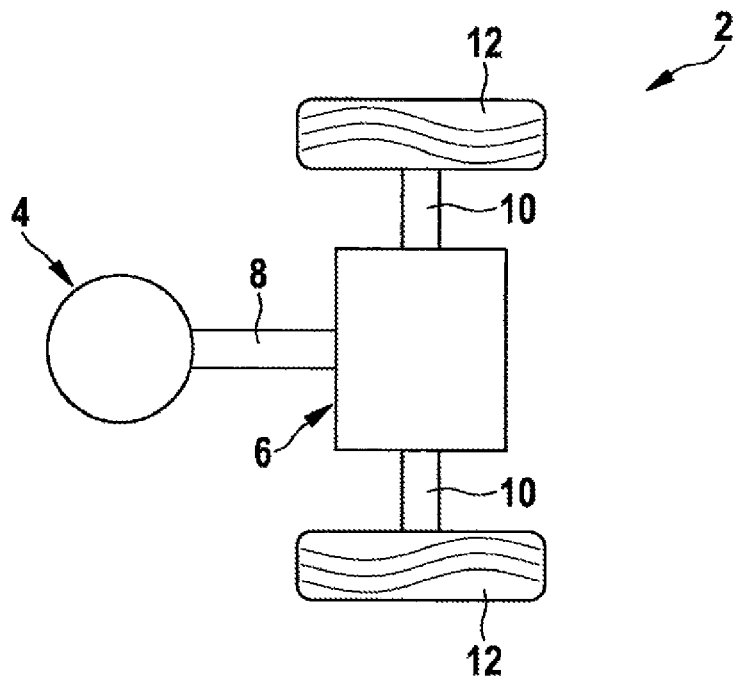
FIG. 2 shows a model of a vehicle drive train according to the present invention.

FIG. 2 shows a model of a vehicle drive train according to the present invention.

The modeled vehicle drive train 2 for a hybrid electric vehicle or an electric vehicle comprises an electric motor drive element 4, which is coupled to a gearbox 6 using a drive shaft 8. Starting from the gearbox 6, two drive wheels 12 are connected to the electric motor 4 via axle shafts 10 by way of example. A rotation of the electric motor 4 is thus transferred via the drive shaft 8, gearbox 6 and axle shafts 10 into a rotation of the drive wheels 12.

Because of the transfer of the rotary motion from the electric motor drive element 4 to the drive wheels 12 using a plurality of intermediate elements, especially by means of their predominant elasticities and dampings, electric motor 4 can vibrate when driving the drive wheels 12.

Figure 3:
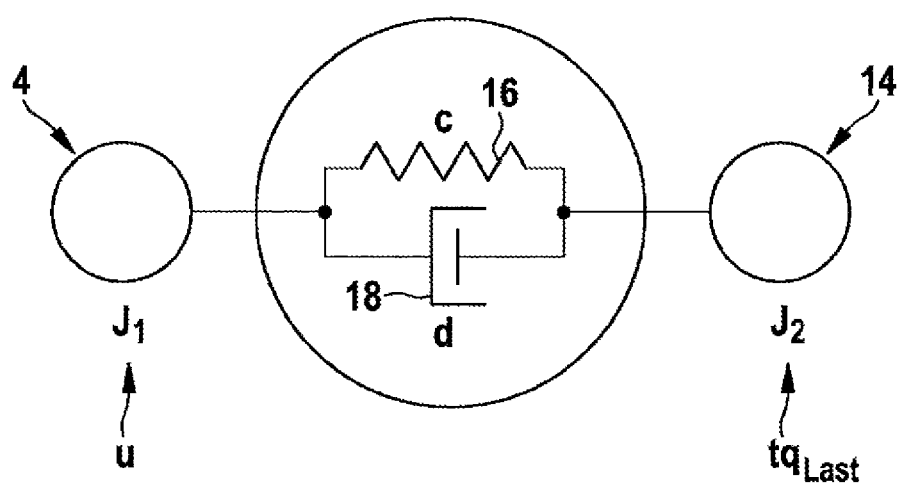
FIG. 3 shows an exemplary embodiment of a reduced drive train model rDTM according to the present invention.

FIG. 3 shows an exemplary embodiment of a reduced drive train model rDTM according to the present invention, especially an equivalent circuit diagram or a reduced model using a reduced drive train model rDTM of FIG. 2.

In the reduced model of FIG. 3 the rotation of the electric motor drive element 4 or its rotor rotation is transferred to the rotation of the vehicle 14, especially its drive wheels 12. An equivalent moment of inertia $J_2$, which especially takes into account an equivalent vehicle mass, which ultimately transfers the vehicle mass to a rotation of the drive wheels 12, is used as the moment of inertia of the electric motor 4 $J_1$, as the moment of inertia of the vehicle including all running resistances. Thus the drive or forward movement of the vehicle 14 can be converted into a rotation of the drive wheels 12, taking into account a corresponding equivalent vehicle mass.

The connection of the electric motor drive element 4 to the drive wheels 12 or the vehicle 14 takes place in FIG. 3 using an equivalent elasticity of the drive train, therefore a mathematical model of the physical behavior of the drive train, especially the following elements: drive shaft 8, gearbox 6 and axle shafts 10 of the vehicle drive train 2 according to FIG. 2.

The mathematical model of the drive train consists here of a mutually parallel spring element 16 and a damping element 18. The spring element 16 here has an equivalent stiffness c and the damping element 18 has an equivalent damping coefficient d.

The electric motor drive element 4 uses a system stimulation u, e.g. the torque of the electric motor drive element 4. The moment of inertia of the vehicle $J_2$ is affected by the load torque $tq_{Last}$ of the vehicle, e.g. friction. The angular acceleration $\omega_1$ of the rotor of the electric motor drive element 4 and $\omega_2$ the angular acceleration of the vehicle mass, converted to a rotary motion using the equivalent vehicle mass, can be represented respectively by the two following equations:

$$\dot{\omega}_1(t) = -\frac{c}{J_1} \cdot (\Phi_1(t) - \Phi_2(t)) - \frac{d}{J_1} \cdot (\omega_1(t) - \omega_2(t)) + \frac{1}{J_1} \cdot u(t) \quad \text{Equation 1}$$

$$\dot{\omega}_2(t) = \frac{c}{J_2} \cdot (\Phi_1(t) - \Phi_2(t)) - \frac{d}{J_2} \cdot (\omega_1(t) - \omega_2(t)) - \frac{1}{J_2} \cdot tq_{Last}(t) \quad \text{Equation 2}$$

where $J_1$: moment of inertia of the electric motor drive element;
$J_2$: moment of inertia of the vehicle;
c: equivalent stiffness of the vehicle drive train according to rDTM;
d: equivalent damping coefficient of the vehicle drive train according to rDTM;
u: system stimulation/torque of the electric motor drive element;
$tq_{Last}$: load torque of the vehicle;
$\dot{\omega}_1$: angular acceleration of the rotor of the electric motor drive element;
$\dot{\omega}_2$: angular acceleration of the equivalent vehicle mass;
$\omega_1$: angular speed/revolution rate of the rotor of the electric motor drive element
$\omega_2$: angular speed/revolution rate of the equivalent vehicle mass;
$\varphi_1$: current angle of rotation of the rotor of the electric motor drive element; and
$\varphi_2$: current angle of rotation of the rotor of the equivalent vehicle mass.

$\omega_1$ corresponds here to the angular speed or revolution rate of the rotor of the electric motor drive element 4 and $\omega_2$ to the angular speed/revolution rate of the equivalent vehicle mass of the vehicle 14.

φ1 or φ2 respectively form the angle of rotation of the rotor of the electric motor drive element 4 or the equivalent vehicle mass, related to the drive wheels 12.

The oscillation characteristic $\omega_{Osc}$ represents the difference of $\omega_1$ and $\omega_2$.

Continuing to refer to FIG. 4, an exemplary process diagram of the method for active damping control according to the present invention is illustrated.

Method 30 for active damping control for an electric vehicle or hybrid vehicle with an electric motor drive element uses a current target torque value $tq_{ElmDes}$, which e.g. is specified by a driver of a vehicle using a gas pedal 20. A current damping torque value $tq_{Dmp}$ can be determined using the reduced drive train model rDTM according to FIG. 3 and taking account of the equivalent stiffness c of the vehicle drive train, the equivalent damping coefficient d of the vehicle drive train and the current angle of rotation of the machine $\varphi_{ElmAct}$. The current angle of rotation $\varphi_{ElmAct}$ of the electric motor drive element 4 may be determined e.g. by a measurement on the electric motor drive element. $\varphi_{ElmAct}$ corresponds here to $\varphi_1$ of equations 1 and 2.

The target torque $tq_{ElmDes}$ corresponds here to u(t). In particular, the damping torque $tq_{Dmp}$ can be determined from $\omega_{Osc}$, thus as $\omega_1 - \omega_2$. Furthermore, $tq_{Dmp}$ especially represents $\omega_{Osc}$ multiplied by the factor element $k_{Dmp}$.

Factor element $k_{Dmp}$ can initially be a constant factor as previously mentioned, but should especially be dynamically adapted to the speed of the vehicle v, a wheel revolution rate $n_{Rad}$ or a rotor revolution rate of the electric motor drive element 4 or else to the estimated revolution rate $\omega_2$ of the equivalent vehicle mass or should be dependent thereon.

The damping moment of inertia $tq_{Dmp}$ can then be limited in its maximum value $tq_{Dmpmax}$ using a saturation block 22 and can have an activation threshold $tq_{Dmpmin}$. A corresponding implementation of a curve profile between $tq_{DmpEin}$ and $tq_{DmpAus}$ of the saturation block is shown in FIG. 4.

After the saturation block 22 the calculation of the delivered torque of the electric motor $tq_{ElmAct}$ takes place as $tq_{ElmAct} = tq_{ElmDes} - tq_{DmpAus}$.

The resulting torque of the electric motor drive element 4 is in turn coupled into the reduced drive train model of FIG. 3. A corresponding calculation can now be continued in its next iteration.

At the same time the reduced drive train model provides the estimated angle of rotation $\varphi_{ElmEst}$, which signal can be used instead of $\varphi_{ElmAct}$ as the signal for current regulation of the electric motor drive element 4. Because of the use of the angle of rotation $\varphi_2$ compared to $\varphi_1$ or $\omega_2$ compared to $\omega_1$, a directly compensated control of the electric motor drive element 4 takes place. The signal quality of the angle of rotation used for the regulation can generally be significantly improved by this compared to the angle of rotation $\varphi_{ElmAct}$ directly determined from a sensor.

In particular, with the method of the present invention a speed of the vehicle v is not determined or used for calculation of a compensation torque, but rather a current revolution rate of the rotor of an electric motor drive element is used. As a result, speed-dependent parameterization of a drive control may be performed. Alternatively, an estimated revolution rate $\omega_2$ of the electric motor drive element 4 or of a drive wheel 12 can also be used.

In addition it is determined that the method according to the invention does not intervene in the revolution rate control, but rather in the torque control. Thus success according to the invention can also be achieved when driving off from a stationary vehicle state. The oscillation characteristic is thus uniquely determined by a revolution rate signal or a bearing angle signal of an electric motor drive element 4 and especially not from a difference measurement between a target revolution rate and an actual revolution rate. The current control of an electric motor drive element 4 remains unaffected by this and does not have to be adapted. The only task of the current control is the adjustment of the torque $tq_{ElmAct}$.

The invention claimed is:

1. A method (30) for active damping control for an electric vehicle or hybrid vehicle with an electric motor drive element, comprising
    obtaining a current target torque value ($tq_{E1mDes}$) of the electric motor drive element (4);
    determining a current angle of rotation value ($\varphi_{ElmAct}$) of the electric motor drive element (4);
    determining, by a controller, a current damping torque value ($tq_{Dmp}$),
    determining, by the controller, a current drive torque value ($tq_{ElmAct}$) for controlling the electric motor drive element (4) from the difference of the current target torque value ($tq_{E1mDes}$) and the current damping torque value ($tq_{Dmp}$) as $tq_{ElmAct} = tq_{ElmDes} - tq_{Dmp}$; and
    controlling the electric motor drive element (4) based on the current drive torque value ($tq_{ElmAct}$);
    wherein the current damping torque value ($tq_{Dmp}$) is determined using a reduced drive train model (rDTM), and is limited to a maximum value ($tq_{Dmpmax}$), and is set to zero below an activation threshold ($tq_{Dmpmin}$).

2. The method as claimed in claim 1, further comprising the determination of an estimated rotation angle value ($\varphi_{E1mEst}$) from the current target torque value ($tq_{E1mDes}$) and the current rotation angle value ($\varphi_{E1mAct}$) using the reduced drive train model (rDTM); and
    controlling the electric motor drive element using the estimated rotation angle value ($\varphi_{E1mEst}$).

3. The method as claimed in claim 1, further comprising the determination, using the reduced drive train model (rDTM), of an oscillation characteristic ($\omega_{Osc}$) from the angular speed ($\omega_1$) of the rotor of the electric motor drive element and from the angular speed ($\omega_2$) of an equivalent vehicle mass as $w_{Osc} = \omega_1 - \omega_2$ from $$\dot{\omega}_1(t) = -\frac{c}{J_1} \cdot (\Phi_1(t) - \Phi_2(t)) - \frac{d}{J_1} \cdot (\omega_1(t) - \omega_2(t)) + \frac{1}{J_1} \cdot u(t) \quad \text{Equation 1}$$

$$\dot{\omega}_2(t) = \frac{c}{J_2} \cdot (\Phi_1(t) - \Phi_2(t)) - \frac{d}{J_2} \cdot (\omega_1(t) - \omega_2(t)) - \frac{1}{J_2} \cdot tq_{Last}(t) \quad \text{Equation 2}$$

with
    $J_1$: moment of inertia of the electric motor drive element;
    $J_2$: moment of inertia of the vehicle;
    C: equivalent stiffness of the vehicle drive train according to rDTM;
    d: equivalent damping constant of the vehicle drive train according to rDTM;
    u: system stimulation/torque of the electric motor drive element;
    $tq_{Last}$ load torque of the vehicle;
    $\dot{\omega}_1$: angular acceleration of the rotor of the electric motor drive element;
    $\dot{\omega}_2$: angular acceleration of the equivalent vehicle mass;
    $\omega_1$: angular speed/revolution rate of the rotor of the electric motor drive element
    $\omega_2$: angular speed/revolution rate of the equivalent vehicle mass;
    $\varphi_1$: current angle of rotation of the rotor of the electric motor drive element; and
    $\varphi_2$: current angle of rotation of the rotor of the equivalent vehicle mass.

4. The method as claimed in claim 3, wherein the current damping torque value ($tq_{Dmp}$) is determined from the oscillation characteristic ($\omega_{Osc}$) using a factor $k_{Dmp}$ as $tq_{Dmp} = k_{Dmp} * \omega_{Osc}$.

5. The method as claimed in claim 4, wherein the factor $k_{Dmp}$ is a non-constant factor.

6. The method as claimed in claim 5, wherein the factor $k_{Dmp}$ has a functional dependency of at least one value from the group consisting of the speed of the vehicle v–($k_{Dmp}$=f($v_{Fahrzeug}$)), the wheel revolution rate n–($k_{Dmp}$=f($n_{Rad}$)) or the rotor speed of the electric motor drive element ($k_{Dmp}$=f($\omega_1$)) and the angular speed $\omega_2$ of an equivalent vehicle mass–($k_{Dmp}$=f($\omega_2$)).

7. A controller for a vehicle, arranged to perform the method (30) according to claim 1.

8. A vehicle comprising a controller as claimed in claim 7.

9. The method as claimed in claim 1, wherein the current damping torque value ($tq_{Dmp}$) is limited to a maximum value ($tq_{Dmpmax}$).

10. The method as claimed in claim 1, wherein the current damping torque value ($tq_{Dmp}$) is set to zero below an activation threshold ($tq_{Dmpmin}$).

11. The controller for a vehicle as claimed in claim 7, wherein the vehicle is an electric vehicle or hybrid vehicle.

* * * * *